United States Patent

[11] 3,598,320

| [72] | Inventors | Rene Babin<br>les Clayes-Sous-Bois;<br>Andre Alphonse Mederic Leon<br>Camboulives, Billancourt; Jean Lucien<br>Simonin, Issy-les-Moulineaux, all of, France |
|---|---|---|
| [21] | Appl. No. | 885,219 |
| [22] | Filed | Dec. 15, 1969 |
| [45] | Patented | Aug. 10, 1971 |
| [73] | Assignee | Societe Nationale D-Etude Et De<br>Construction De Moteurs D'Aviation<br>Paris, France |
| [32] | Priority | Dec. 16, 1968 |
| [33] | | France |
| [31] | | 178,414 |

[54] NOZZLE DEVICE HAVING A REVERSE THRUST SYSTEM
7 Claims, 6 Drawing Figs.

| [52] | U.S. Cl. | 239/265.25 |
| [51] | Int. Cl. | B64c 15/04 |
| [50] | Field of Search | 239/265.19, 265.25, ,265.27, 265.29, 265.31, 265.33, 265.37, 265.41; 60/228, 230; 244/12 D, 23 D, 110 B |

[56] References Cited
UNITED STATES PATENTS

| 2,408,099 | 9/1946 | Sherman | 239/265.29 UX |
| 3,266,734 | 8/1966 | Gahagan et al. | 244/110.3 X |

FOREIGN PATENTS

| 23,040 | 7/1960 | East Germany | 239/265.19 |
| 745,649 | 2/1956 | Great Britain | 239/265.29 |

Primary Examiner—M. Henson Wood, Jr.
Assistant Examiner—Edwin D. Grant
Attorney—William J. Daniel ABSTRACT: A jet engine nozzle device comprising a primary nozzle system, a fairing surrounding said primary nozzle system and defining in relation thereto an annular duct for flow of air, and a thrust-reversing system carried by the fairing and constituted by reverse thrust obstacles adapted to be displaced into an operative position in which they are disposed in the path of the hot gases flowing through said primary nozzle system and thus deflect said gases towards openings distributed over the wall of the fairing, the primary nozzle system comprising at the rear a movable jet pipe section having a rear edge which is normally located to the rear of the thrust-reversing system, while means are provided to displace said movable jet pipe section forwardly in order to permit said obstacles to move into their positions for reverse thrust and deflect the hot gases towards said openings, which are associated with obturating elements which uncover them in the reverse thrust condition and form walls of ducts which channel the thus deflected hot gases across said annular duct.

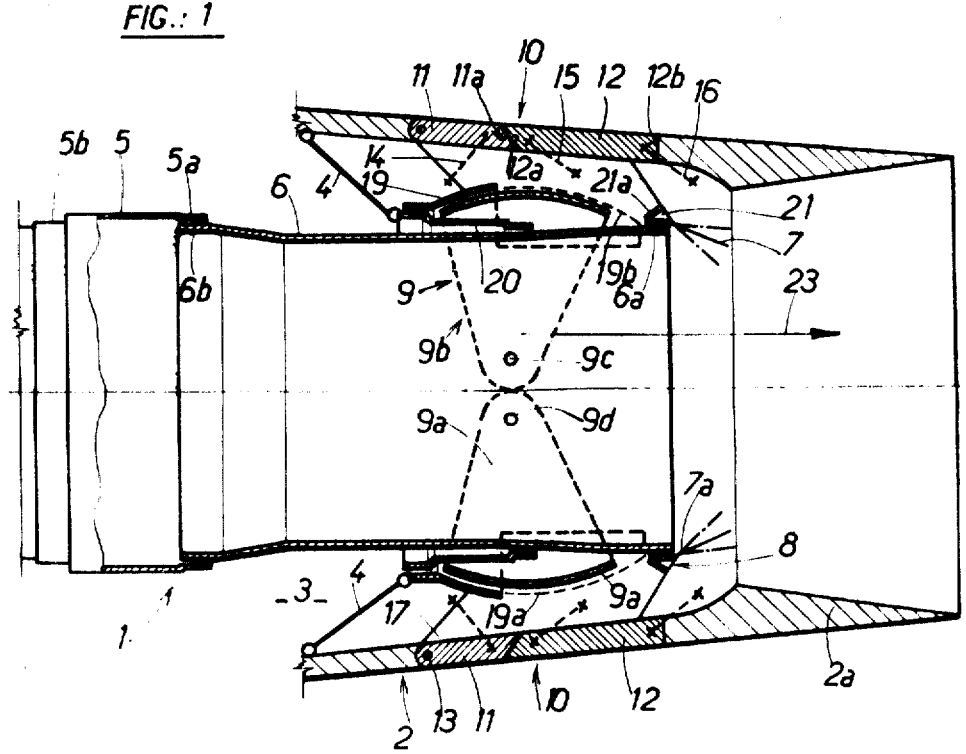
FIG.: 1
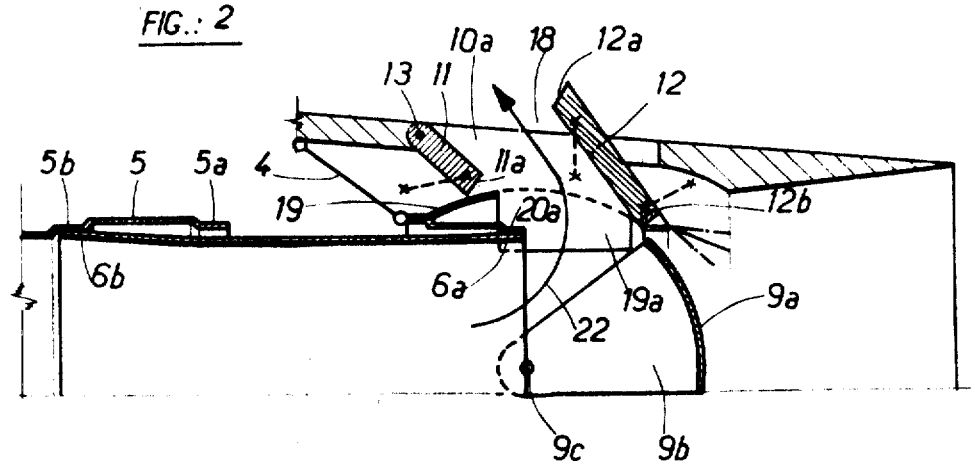
FIG.: 2

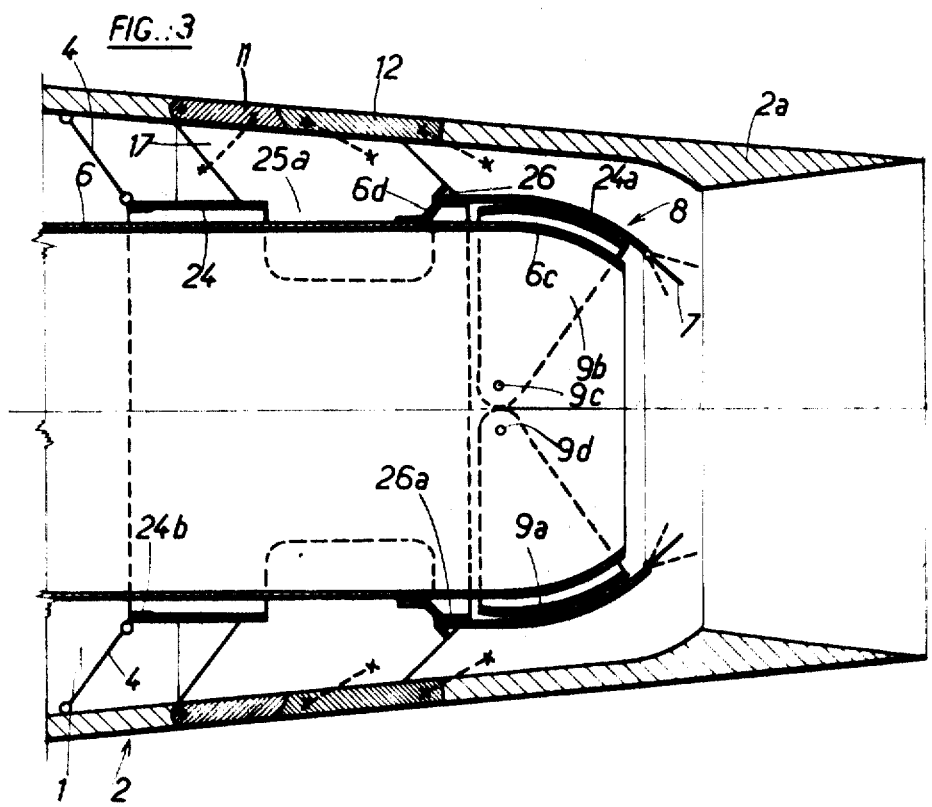
FIG.:3
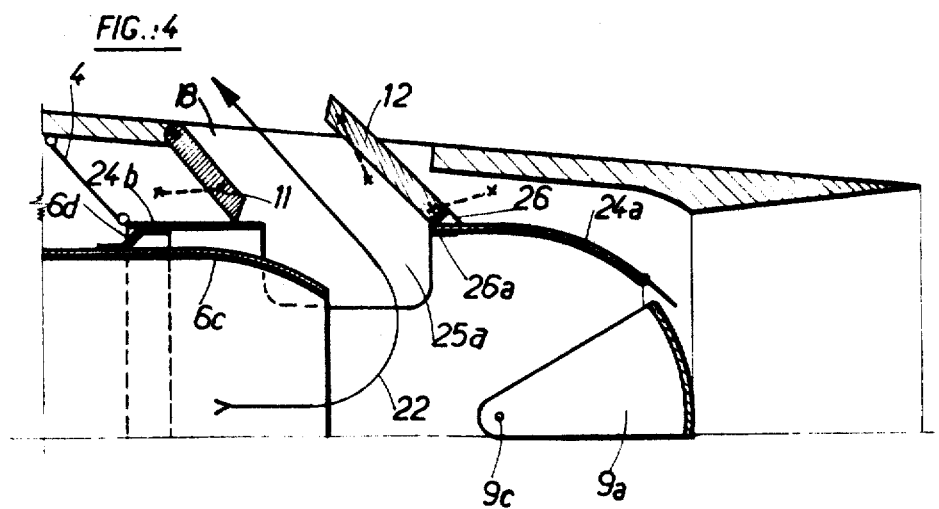
FIG.:4

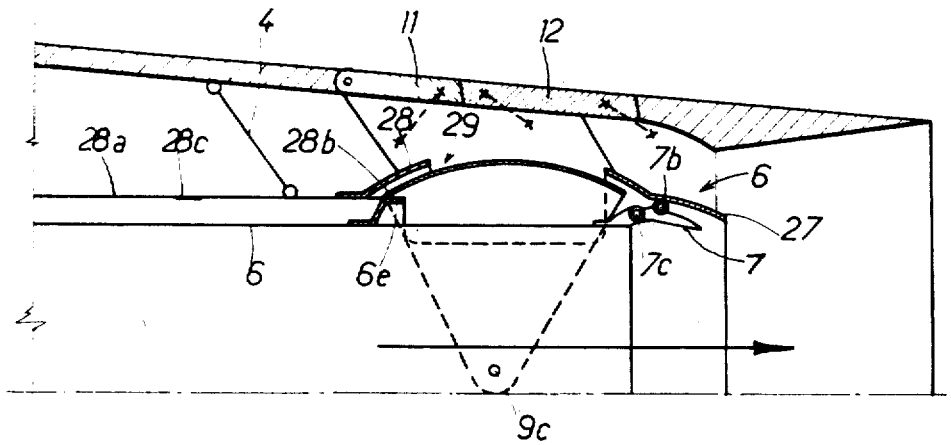
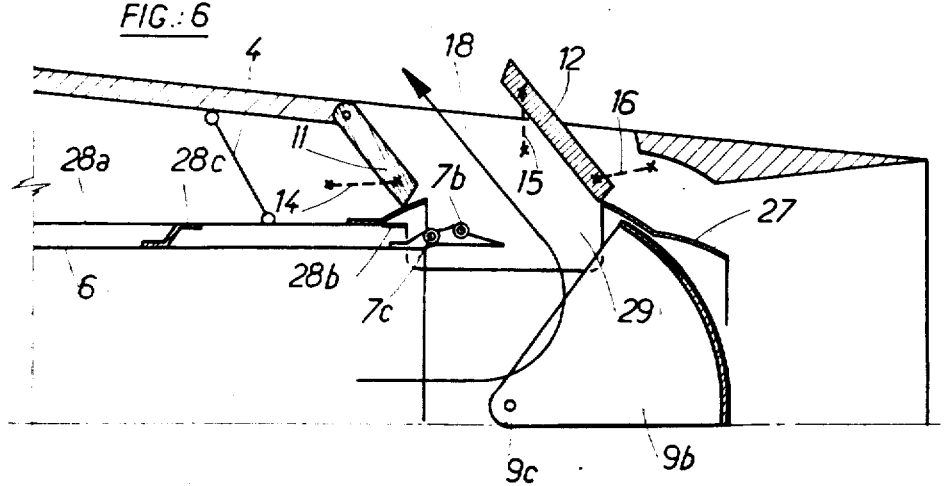

3,598,320

NOZZLE DEVICE HAVING A REVERSE THRUST SYSTEM

BACKGROUND OF THE INVENTION

This invention relates to an aircraft jet engine nozzle comprising a primary jet pipe and nozzle surrounded by a fairing, which may contain a secondary nozzle, the fairing being constituted by the aircraft fuselage for example. The invention relates to a nozzle device of this kind comprising a reverse thrust system constituted by thrust-reversing obstacles which are movable into the path of the hot gas jet in order to deflect it through diametrically opposite openings in the fairing.

PRIOR ART

In known arrangements, the thrust-reversing obstacles and the lateral openings are usually located downstream of the primary nozzle and this makes it essential to provide, between the exit of the primary nozzle and the exit of the fairing or secondary nozzle, a length greater than that which is required for matching the nozzle system to all flight conditions. In addition, the presence of the obstacles, which are heavy and bulky, downstream of the primary nozzle in a very hot zone, creates heat problems for these obstacles, for their system of articulation, and for the seals used to close the openings when reverse thrust is not operative.

BRIEF SUMMARY OF THE INVENTION

In accordance with the invention, the thrust-reversing arrangement is located upstream of the exit of the primary nozzle. The primary jet pipe does not contain a lateral opening but has a movable section which can be displaced longitudinally upstream for the reverse thrust condition, in order to allow the obstacles to deflect the jet through the openings in the fairing. These openings are equipped with obturating elements which, in the reverse thrust condition, form ducts to channel the hot gases through said openings in the fairing.

The location of the reverse thrust obstacles upstream of the exit section of the primary nozzle and outside the primary jet pipe, has the advantages of enabling said jet pipe to be lengthened for a given length of the secondary fairing, and to remove the obstacles, their joint arrangements and the seals, from the zone which is exposed to the high temperature of the gas jet. In addition, the thrust-reversing deflectors constituted by the elements which obturate the openings and likewise located upstream of the exit section of the primary nozzle, are only subjected in normal flight to the cold secondary flow which passes at low pressure outside the primary system. The sealing of these thrust-reversing deflectors consequently presents no problem.

In addition, the hot gases are channelled right up to the openings in the fairing in the reverse thrust condition and there is consequently no risk of them penetrating into the annular space surrounding the primary system, or into the airframe.

FURTHER FEATURES OF THE INVENTION

The primary nozzle is generally equipped with control flaps which enable its exit section to be varied. In one embodiment, these flaps are carried by a structure which is integral with the fixed fairing; the movable section of the jet pipe, in displacing upstream into its position for reverse thrust, opens up in front of the flaps a passage for the hot gases which are deflected by the thrust-reversing system.

Another embodiment applies to nozzles of the kind with a fixed jacket serving as a cam for rollers carried by the flaps articulated to the rear end of the movable section of jet-pipe-forming part of the primary nozzle system, the arrangement being such that regulation of the flap positions is effected by slight axial displacements on the part of said jet pipe section. In this other embodiment, the jacket is carried by the fixed structure or airframe and the movable jet pipe section is displaced substantially upstream in the reverse thrust condition, in order to enable the thrust-reversing system to operate.

The fixed structure or airframe structure is, for example, attached to the fixed fairing. The longitudinal partitioning elements which cooperate with the deflectors of the thrust-reversing system in the reverse thrust condition, in in order to form ducts which will channel the hot gases, are attached to the fairing and bear against said structure.

The position of the movable jet pipe section in normal flight can be such that it prevents the deploying of the reverse thrust obstacles or deflectors. In another arrangement, the reverse thrust obstacles can be moved into their positions for reverse thrust even where jet pipe is in the normal flight condition; however it is necessary nevertheless to displace the movable jet pipe section forward in order to clear passage for the hot gases to the openings in the secondary fairing.

SUMMARY OF DRAWINGS

The ensuing description which relates to the attached drawings, given purely by way of a nonlimitative example, will indicate how the invention may be carried into practice, the features contained both in the drawing and the text forming, self-evidently, part of said invention.

In the drawings:

FIG. 1 schematically illustrates a nozzle device in accordance with the invention, viewed in axial section and in the normal flight condition, FIG. 2 is an axial half-section, showing the device of FIG. 1 in the reverse thrust position, FIGS. 3 and 4 are views respectively similar to those of FIGS. 1 and 2, showing another embodiment, and FIGS. 5 and 6 are views respectively similar to those of FIGS. 3 and 4, showing another embodiment in axial half-section.

DESCRIPTION OF EMBODIMENTS

FIGS. 1 and 2 illustrate a primary nozzle system 1 for the discharge of the hot gas jet from a jet engine which has not been illustrated, and a fairing 2 which is connected to the rear of the nacelle (not shown), of the jet engine, so that the annular space 3 defined between the primary system and the fairing passes a flow of secondary air. In the embodiment illustrated, the fairing 2 terminates with a secondary fixed nozzle 2a but it will be clear that the secondary nozzle could equally well be equipped with control flaps.

The primary system comprises, from front to rear, an extension piece 5 forming a jet pipe section fitted to the rear of the jet engine (not shown), a movable jet pipe section 6 and a nozzle proper, 21. The movable flame tube section 6 is centered upstream in the extension piece 5 and downstream in a structure which forms a reverse thrust body 8, is connected to the fairing 2 by a suspension arrangement 4, and contains two diametrically opposite openings 19a, 19b. The nozzle 21 is attached to the reverse thrust body by a flange 21a and is equipped with flaps 7.

The reverse thrust obstacles 9 are constituted by a pair of walls in the form of spherical lunes 9a and 9b, articulated at 9c and 9d about axes parallel to a diametral axis of the reverse thrust body, which diametral axis is also the axis of symmetry of the two openings 19a, 19b.

The secondary body is equipped with two deflectors 10, at diametrically opposite positions, each comprising two flaps 11, 12, which, in the reverse thrust condition (FIG. 2), uncover a rectangular opening 10a. The flap 11 is articulated at 13 to the fairing 2 and can pivot towards the interior under the control of a link 14 operated by a jack (not shown). The flap 12 is fixed to two links 15, 16 operated by other jacks (likewise not shown), enabling it to be displaced from the position shown in FIG. 1 to that shown in FIG. 2.

The trailing edge 11a of the flap 11 and the leading edge 12a of the flap 12 are chamfered to form two mating edges so that the deflectors can open while, when in the position shown in FIG. 1, there is proper contact between them in order to provide obturation of the opening. The flaps 11 and 12 of each of the deflectors or doors 10 deploy between two longitudinal partition elements 17 fixed to the fairing 2, and remain in contact with these elements during their deployment. The partition elements 17, in the position shown in FIG. 2, thus form the sidewalls of two ducts 18 whose front and rear walls are constituted respectively by the flaps 11 and 12.

The sidewalls 17 rest against the reverse thrust body 8 which surrounds the movable jet pipe section 6 and the reverse thrust obstacles 9, in the normal flight conditions (FIG. 1). The reverse thrust body 8 comprises, at the center, a spherical ring 19 containing two openings 19a and 19b, at the front a casing of generally cylindrical form 20 and at the rear the flange 21a for the attachment of the nozzle proper, 21.

Laterally, the orifices 19a and 19b enable the four sideplates 17 (FIG. 1) to come into contact. Inside the ring 19 are located the obstacles 9a and 9b (FIG. 1). The bearings 9c and 9d by which the obstacles 9a and 9b are hinged form part of the spherical ring 19. Their axes are perpendicular to a plane passing through the axis of the nozzle and through the centers of the openings 10a.

The casing 20 is fixed in a sealed manner to the front end of the ring 19 and is provided with a half-seal 20a in which a complementary half-seal 6a, provided at the rear of the movable jet pipe section 6, is centered in sealed manner in the position shown in FIG. 2.

The flange 21a is fixed to the rear of the spherical ring 19. The flaps 7 are articulated at 7a to the flange 21a of the nozzle. The internal diameter of the latter serves as a half-seal 21a similar to the seal 20a already mentioned, in which half-seal 21a there is centered in sealed manner, in the position shown in FIG. 1, the complementary half-seal 6a of the movable jet pipe section 6.

It will be seen that in the position shown in FIG. 2, the trailing edges 11a of the flaps 11 bear against the ring 19 along the front edges of the openings 19a and 19b, while the trailing edges 12b of the flaps 12 bear against the flange 21a along the rear edges of these same slots. The rectangular section ducts 18, delimited by the flaps 11 and 12 and by the sideplates 17, are virtually completely sealed so that there is no risk of the hot gases, deflected by the obstacles 9 in the direction of the arrow 22, penetrating into the annular space 3.

In order to ensure sealing of the movable jet pipe section 6 at the upstream end, that is to say where it joins the fixed extension piece 5, the movable jet pipe section 6 is equipped at the front with a half-seal 6b which is centered in sealed manner, in the position shown in FIG. 1, in a complementary half-seal 5a provided at the rear of the extension piece, and in the position shown in FIG. 2, in a half-seal 5b provided at the front of said extension piece 5.

In the normal flight condition (FIG. 1), the flaps 11 and 12 are closed and the movable jet pipe section 6, in the rearward position, is centered at its front end by the extension piece 5 and at its rear end by the flange 21a. Sealing is ensured at the front end by cooperation between the half-seals 5a and 6b, and at the rear by cooperation between the half-seals 6a and 21a. The flow of hot gases 23 passing through the primary nozzle cannot mix with the secondary flow passing through the annular space 3 before exit from said primary nozzle. Through the deflectors or doors 10, it is only secondary air losses which can occur, so that these deflectors need not provide a perfect seal. Moreover, these deflectors 10 are not subjected to high temperatures and pressures.

In addition to the jacks already mentioned for operating the flaps 11 and 12, other jacks (not shown) are provided which make it possible, on the one hand, to slide the movable jet pipe section 6 from the position shown in FIG. 1 into the position shown in FIG. 2, and on the other hand, make it possible to pivot the obstacles 9 from positions for normal flight (FIG. 1) to the positions for reverse thrust (FIG. 2). In order to move the system from the first to the second of these positions, the jacks are controlled by the pilot in order simultaneously or successively to bring about the following displacements:

opening of the four flaps 11 and 12 until they come into contact with the reverse thrust body 8;

translation of the movable jet pipe section 6 in the upstream direction;

pivoting of the reverse thrust obstacles 9 as a consequence of the displacement of the jet pipe section 6.

This pivoting movement uncovers the slots 19a and 19b and the obstacles 9a and 9b of spherical lune form deflect the gases into the ducts 18 in the manner schematically indicated by the arrow 22.

It will be observed that in the reverse thrust condition, the flaps 12 move outside the fairing and are directed forward so that they assist in the deflection of the hot gases in the upstream direction.

In order to change from the reverse thrust condition to the normal flight condition, the movements take place in the following order:

the obstacles 9 are pivoted so that they are retracted into the ring 19 at either side;

the movable jet pipe section 6 is moved towards the rear into the position shown in FIG. 1, in order to reestablish the primary flow in accordance with the normal flight condition;

the flaps 11 and 12 are closed in order to reestablish the external profile of the fairing 2.

It is worthy of note that the retention of the movable jet pipe section 6 in the rear position can be achieved by the drag effect exerted by the hot gas jet, so that it is not necessary to lock it in position.

It is also worthy of note that the above-described device in accordance with the invention has the advantage that it allows a substantial degree of misalignment between the gas generator, constituted by the jet engine units located upstream of the primary jet pipe, and the nozzle device; these two parts of the system are liable to displace in relation to one another on the one hand because of the distortions undergone by their components and by their suspension arrangements as a consequence of thermal and mechanical stresses, and on the other hand as a consequence of wing distortions in the case where the engine nacelle is attached. Moreover, the device in accordance with the invention makes it a simple matter to ensure sealing both at the entry to the movable jet pipe section and between the exit thereof and the lateral openings of the secondary fairing, in the reverse thrust condition.

Thus, the movable jet pipe section 6, which provides continuity between the fixed extension piece 5 of the jet engine and the exit of the primary nozzle (flaps 7) in the normal flight condition, and between said fixed extension piece 5 and the reverse thrust system in the reverse thrust condition, can be assembled independently of the extension piece 5 and of the reverse thrust body 8, requiring only two sealing devices, namely the devices 5a, 5b, 6b at the front, and the devices 20a, 21a, 6a at the rear. These devices will advantageously comprise knuckle joints similar to those described in U.S. Pat. No. 3,307,108, in which the elements to be assembled together are connected to one another by a single link attached to their walls by a broad joint so that considerable offset in these elements is permissible. All that is necessary in the present instance, is to replace the link by the jack which is used to translate the movable jet pipe section.

The junction between the movable jet pipe section 6 and the extension piece 5 can be established, for example, by means of a jack whose cylinder is articulated by a ball joint to the wall of the extension piece 5, and whose rod is articulated to the wall of the movable jet pipe section 6, the half-seal 6b being constituted by an annular element in the form of a zone of a sphere, adapted to cooperate with one or other of the two complementary elements 5a or 5b in order to form ball joints.

The junction between the movable jet pipe section 6 and the ring 21 can be established in a similar manner, so that any desired relative movements on the part of the jet engine fixed to the extension piece 5 can take place in relation to the external fairing 2 which is fixed to the airframe.

In the embodiment of FIGS. 3 and 4, the same elements are shown, and the same references have been used. However, the reverse thrust body 8, against which the sideplates 17 bear in the embodiment set out in the preceding figures, simply has a cylindrical casing 24, the rear portion 24a of which is waisted, in the form of part of a sphere, in order to receive the reverse thrust obstacles 9 in the normal flight condition (FIG. 3). The movable jet pipe section 6 comprises a rear portion 6c *of corresponding form so that the obstacles 9 deploy between the portions 24a and 6c.* The flaps 7 are articulated to the rear of the portion 24a.

The casing 24 is equipped with slots 25a at the entry to the ducts 18, and these slots are bordered at the rear by a ring 26 of triangular section which performs a similar function to that of the ring 21 in the preceding figures. The movable jet pipe section 6 is equipped with a half-seal 6d projecting towards the exterior and cooperating in sealing relationship either with a half-seal 26a carried by the ring 26 (FIG. 3), or with a half-seal 24b carried by the casing 24 (FIG. 4).

In this embodiment, the obstacles 9 can pivot in the closing direction when the movable jet pipe section is still in the rearward position (FIG. 3), but it is necessary to displace this section 6 forward in order to uncover the ducts 18 (FIG. 4).

In the embodiment of FIGS. 5 and 6, the reverse thrust body 8 against which the sideplates 17 rest, comprises at the rear an angular jacket 27 having a cam profile cooperating in the normal flight condition with rollers 7b on the flap 7, the latter flaps being articulated at 7c to the rear of the movable jet pipe section 6 so that a small displacement on the part of the movable jet pipe section 6 towards the front or towards the rear (FIG. 5), makes it possible to regulate the position of the flaps 7.

The jacket 27 is fixed at the rear to a ring 28 similar to the ring 19 of FIGS. 1 and 2, and comprises slots 29 at the entry to the ducts 18. The ring 28 is extended forward in the form of a cylindrical casing 28a.

The movable jet pipe section 6 is equipped with a half-seal 6e which, in its two terminal positions, cooperates in a sealing manner either with a half-seal 28b carried by the ring 28, or with a half-seal 18c carried by the casing 28a. On change from the normal flight condition (FIG. 5) to the reverse thrust condition (FIG. 6), the movable jet tube section 6 displaces forwards and the rollers 7b of the flaps leave the cam of the jacket 27 so that the flaps 7 pivot outwards into a terminal position shown in FIGS. 6.

We claim:

1. A jet engine nozzle device comprising a primary nozzle system including a jet pipe, a fairing surrounding the primary nozzle system and defining in relation thereto an annular air duct, and reverse thrust obstacles carried by the fairing and movable from an inoperative position in which they are retracted away from and around a hot gas flow passing through the primary nozzle system, into a reverse thrust position in which the obstacles are located in the hot gas flow downstream of the primary nozzle system, in order to deflect said gases through local openings in the fairing, the improvement comprising a movable section of the jet pipe which is adapted to be displaced in translatory manner from a rear position in which a rear edge of said movable jet pipe section is located to the rear of the said obstacles when the latter are in the inoperative position, into a forward position in which said obstacles can be displaced into the reverse thrust position behind said movable jet pipe section in order to deflect the hot gases through the openings, comprising obstructing means adapted to be displaced from an obstructing position in which they cover over said openings into a reverse thrust position in which they uncover the openings and form the walls of ducts adapted to channel the deflected hot gases to the openings across the annular duct, comprising means for displacing the movable jet pipe section between the forward and rear positions, and comprising means for displacing the obstructing elements from the obstructing position into the reverse thrust position.

2. A nozzle device as claimed in claim 1, comprising a supporting body suspended from the fairing and carrying a means for regulating the exit section of the primary nozzle system.

3. A nozzle device as claimed in claim 2, in which the regulating means comprise pivotal flaps.

4. A device as claimed in claim 2, in which the regulating means comprise a cam device supported by the supporting body, and flaps pivotally assembled at the rear edge of the movable jet pipe section and having control elements designed to contact the cam device in order to pivot the flaps in response to small displacements on the part of the movable jet pipe section, away from its rear position.

5. A device as claimed in claim 2, in which the supporting body comprises partition elements extending radially in the annular duct and designed to cooperate with said obturating elements in the reverse thrust position, in order to form said ducts.

6. A device as claimed in claim 5, in which the supporting body comprises a tubular element equipped with a seal adapted to bear against the movable jet pipe section in the rearward position thereof and thus provide a seal between said movable jet pipe section and said tubular element, and slots in the tubular element disposed in such manner that said ducts are placed opposite said slots in the reverse thrust condition.

7. A device as claimed in claim 6, in which the obturating elements of each of the openings comprise two flaps movable between two of said wall elements, the flaps having respective edges designed to bear in a sealing manner against said tubular element, respectively at the front and rear of said of said slots.